US008670855B2

(12) United States Patent
Eickhorst

(10) Patent No.: US 8,670,855 B2
(45) Date of Patent: Mar. 11, 2014

(54) METHOD FOR CONTROLLING A PACED PRODUCTION LINE

(75) Inventor: Dirk Eickhorst, Varel-Altjuhrden (DE)

(73) Assignee: Broetje Automation GmbH, Wiefelstede (DE)

( * ) Notice: Subject to any disclaimer, the term of this patent is extended or adjusted under 35 U.S.C. 154(b) by 327 days.

(21) Appl. No.: 13/151,422

(22) Filed: Jun. 2, 2011

(65) Prior Publication Data

US 2011/0301735 A1 Dec. 8, 2011

(30) Foreign Application Priority Data

Jun. 3, 2010 (DE) .......................... 10 2010 022 582

(51) Int. Cl.
*G06F 19/00* (2011.01)
*G05B 13/02* (2006.01)
*B23P 11/00* (2006.01)

(52) U.S. Cl.
USPC ............... 700/100; 700/28; 700/95; 700/96; 700/117; 700/173; 29/33 R; 29/243.53

(58) Field of Classification Search
USPC ............ 700/18, 23, 28, 86–87, 95–97, 100, 700/104–105, 112–117, 173, 181, 253; 29/33 R, 243.53
See application file for complete search history.

(56) References Cited

U.S. PATENT DOCUMENTS

| 4,591,983 | A | * | 5/1986 | Bennett et al. | .................. 706/53 |
| 6,314,630 | B1 | * | 11/2001 | Munk et al. | ................ 29/407.01 |
| 6,430,796 | B1 | * | 8/2002 | Jones et al. | ................ 29/243.53 |
| 6,513,231 | B1 | * | 2/2003 | Hafenrichter et al. | .......... 29/721 |
| 6,726,610 | B2 | * | 4/2004 | Graham et al. | ................ 483/28 |
| 6,758,798 | B2 | * | 7/2004 | Fioroni | ........................ 483/14 |
| 7,162,789 | B2 | * | 1/2007 | Day et al. | ................... 29/525.01 |
| 7,610,668 | B2 | * | 11/2009 | Sprague et al. | ............ 29/525.06 |
| 7,682,112 | B2 | * | 3/2010 | Panczuk et al. | ............... 409/132 |
| 7,684,892 | B2 | * | 3/2010 | Yuan et al. | ..................... 700/181 |
| 7,809,457 | B2 | * | 10/2010 | Yuan et al. | ..................... 700/101 |
| 8,296,923 | B2 | * | 10/2012 | Wampler et al. | ................ 29/560 |
| 8,302,312 | B2 | * | 11/2012 | Stephan | ...................... 29/897.2 |
| 2009/0112350 | A1 | * | 4/2009 | Yuan et al. | .................... 700/117 |

FOREIGN PATENT DOCUMENTS

EP 0 593 127 4/1994

* cited by examiner

*Primary Examiner* — Ramesh Patel
(74) *Attorney, Agent, or Firm* — Michael J. Striker

(57) ABSTRACT

A method is used for controlling a paced production line for processing airplane structural components, wherein the production line comprises at least one workstation having at least one processing machine. It is provided that the processing sequence in the workstation is determined for a production step by determining the expected or actual occupation of the working area by structural component(s) or structural component section(s) for the production step, and, on the basis of the occupation, all of the operations to be performed in this workstation in this production step are determined, and the processing sequence of these operations is optimized.

15 Claims, 5 Drawing Sheets

METHOD FOR CONTROLLING A PACED PRODUCTION LINE

CROSS-REFERENCE TO RELATED APPLICATION

The invention described and claimed hereinbelow is also described in German Patent Application DE 10 2010 022 582.7 filed on Jun. 3, 2010. This German Patent Application, whose subject matter is incorporated here by reference, provides the basis for a claim of priority of invention under 35 U.S.C. 119(a)-(d).

BACKGROUND OF THE INVENTION

The invention relates to a method for controlling a paced production line, and a sequence controller for operating a paced production line.

Within the scope of airplane manufacture, the processing of large airplane structural components is such that high requirements are placed on the particular production apparatus. One reason for this is that the longitudinal extension of the structural components is often greater than the longitudinal extension of the working space of a workstation assigned to the structural component.

Examples of such airplane structural components are fuselage sections or wing sections of an airplane. Typical operations to be carried out within the scope of production in this case are riveting operations, e.g. to connect frames and stringers of a fuselage section, or to connect frames and skin segments of a fuselage section or a wing. The processing of fuselage sections is the focus in this case, and is not intended to be limiting.

Various attempts have been made in the past to automate airplane production, to a partial extent at least. For example, it is known to use numerically controlled riveting robots to perform riveting operations mechanically (EP 0 593 127 181).

It is also known to use a synchronized production line to process airplane structural components such as fuselage sections, wherein the production line includes a riveting processing station with riveting robots, for instance.

In the case of a known production line, the fuselage sections are conveyed in succession through the working area of the riveting workstation in a paced manner. The riveting workstation is seamlessly connected to further workstations through which the fuselage sections likewise pass in a paced manner.

The paced production line described above is such that particularly high requirements are placed on the programming of the numerically controlled riveting robots. The main reason for this is that the fuselage sections pass through the workstations in highly diverse sequences, and therefore a different set of riveting operations must be performed depending on the production step.

Adding to the difficulty is the fact that, due to the differing longitudinal extension of the fuselage sections, the working area of the riveting workstation is typically occupied only by portions of fuselage sections, and not by entire fuselage sections. For example, the riveting workstation can be occupied by two portions of different fuselage sections.

Despite the high programming complexity involved, production lines for airplane manufacture have proven useful. However, it has been shown that actual workpiece throughput can be increased in regard to the theoretically possible workpiece throughput.

SUMMARY OF THE INVENTION

The problem addressed by the invention is that of developing the known method for controlling a paced production line for processing airplane structural components such that workpiece throughput is optimized.

In keeping with these objects and which others which will become apparent hereinafter, one feature of the present invention resides, briefly stated, in a method for controlling a paced production line with at least one workstation having at least one processing machine for processing airplane structural components, the method comprising the steps of performing a predetermined number of mechanical operations on each structural component section and conveying the structural components in succession through a working area of the workstation in a paced manner; occupying the working area of the work station by an element selected from the group consisting of at least one structural component, at least one structural component section, and both depending on a production step; determining a processing sequence in the work station for a production step by determining an occupation of a working area selected from the group consisting of an expected occupation and an actual occupation by at least one structural component or at least one structural component section for the production step; on a basis of the occupation, determining all of forth coming mechanical operation to be performed in the workstation in the production step; optimizing the processing sequence of the operations; and storing the optimized processing sequence in order to be implemented mechanically.

A main consideration is that of redetermining the processing sequence in a workstation for each production step depending on how the working area of the workstation is expected to be occupied or is actually occupied. It therefore becomes possible to respond to the different occupation circumstances with an optimal processing sequence.

Particularly significant in terms of the proposed solution is the fact that the structural components are not considered as a whole with regard to the operations to be performed thereon, but rather as sections. The assigned operations to be performed thereon can therefore be determined for any section of the structural component. Any operation can also comprise a number of suboperations.

According to the proposal, to determine the processing sequence in the workstation for a production step, at first the expected or actual occupation of the working area by structural component(s) or structural component section(s) is determined for said production step. This determination is used, in turn, to determine which operations should be performed in said workstation in said production step. The processing sequence can then be easily optimized using said operations to be performed in an individualized manner for the particular production step, in order to increase the workpiece throughput while adapting the production step accordingly.

In terms of the optimization described above, it is essential that all forthcoming operations to be performed be taken into consideration, even if the work area of the workstation is occupied by two different structural components or structural component sections, for instance. The optimization is therefore oriented toward the expected or actual production circumstances.

The proposed solution is interesting, in particular, when at least some of the operations to be performed are programmed offline, i.e. independently of the production operation. An NC program part is then regularly available for each operation to be performed, wherein the NC program parts and the optimized processing sequence can be used to generate an overall program flow.

The processing sequence can be optimized according to various optimization criteria.

At least some of the processing machines can be configured for the particular operation and the optimization can involve reducing configuration changes. With the scope of optimization, all operations having the same machine configuration can be grouped and intended to be processed in groups.

A tool change can be carried out for the processing machines depending on the operation, and the optimization can involve reducing tool changes.

The riveting machines, in particular the riveting robots, can be equipped with different rivets depending on the operation, and the optimization can involve reducing the changes made to the particular equipment situation.

The optimization can involve reducing the processing time.

At least one processing machine can comprise a manipulator, in particular a robot or the like, and the optimization can involve reducing displacement paths.

According to a further teaching, which is significant in and of itself, a sequence controller for the operation of a paced production line for processing airplane structural components is claimed. The sequence controller is coupled to the machine controllers of the processing machines.

A main point according to said further teaching is that the sequence controller determines the processing sequence in the workstation for a production step in the manner described above, and stores the optimized processing sequence for mechanical implementation.

For the preferred case in which an NC program part—which has been programmed offline in particular—is assigned to each of the operations to be performed, the sequence controller also generates an overall program flow.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
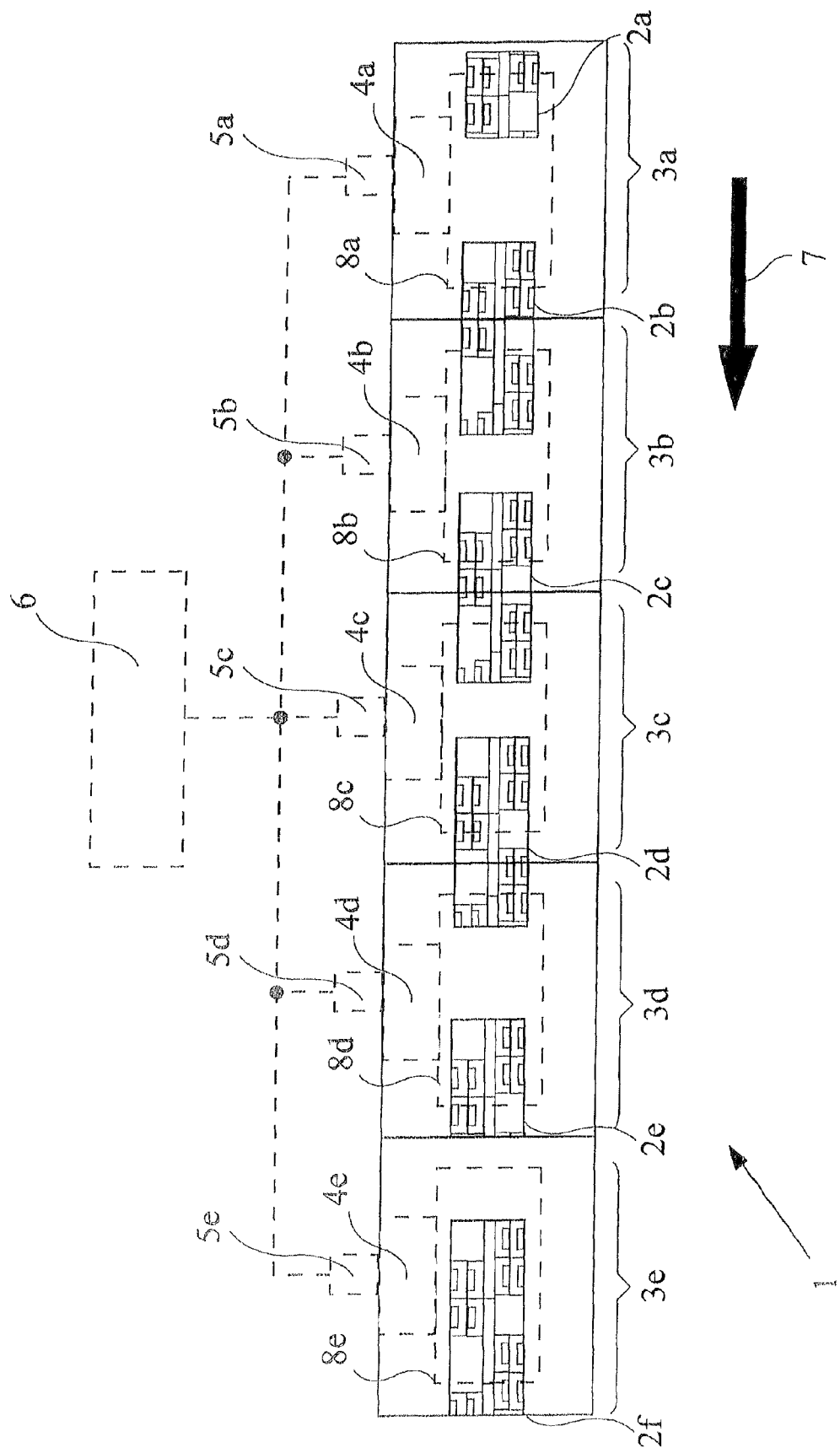
FIG. 1 shows a paced production line for processing airplane structural components, comprising a sequence controller as proposed.

Production line 1 for processing airplane structural components 2, which is depicted in FIG. 1, is used to implement the proposed control method. Production line 1 is equipped with a total of five workstations 3, each of which comprises exactly one processing machine 4. Workstations without processing machines can also be provided, of course, when the workstations are manually operated, for instance. For the rest, the number of workstations 3 and processing machines 4 can be freely selected.

Each processing machine 4 is equipped with a machine controller 5, which is coupled to a sequence controller 6 for control purposes.

In FIG. 1 the reference numerals of some of the repeating components are appended with letters. For clarity, the letter suffix is omitted in the following, provided it is not needed to differentiate between repeating components.

A predetermined number of mechanical operations O should be performed on each structural component 2 and, therefore, on each structural component section. The information related thereto is stored in sequence controller 6 or a higher-order control plane.

Structural components 2 are conveyed in succession through working area 8 of particular workstation 2 in a paced manner. In FIG. 1, the direction of conveyance is labeled with reference numeral 7.

The necessary mechanical operations O can be carried out on the particular structural component section in working area 8 of a workstation 3. In the case of a workstation 3 comprising a riveting robot, working area 8 is a working space that can be reached by the robot.

As shown in FIG. 1, working area 8 of a workstation 3 is occupied by at least one structural component section depending on the production step. For example, workstation 3a is occupied by structural component 2a and a structural component section of structural component 2b. Workstations 3b, 3c and 3d are each occupied by structural component sections of two structural components (2b, 2c; 2c, 2d; 2d, 2e). Workstation 3e is occupied by a structural component section of structural component 2f.

The distribution of structural components 2 among working areas 8 cannot be predicted independently of the particular production situation, since the order of structural components 2 on the production line ultimately depends on the job order planning. in addition, structural components 2 have entirely different longitudinal extensions in conveyance direction 7.

In terms of workpiece throughput, the optimal determination of the processing sequence of operations O to be performed in a workstation 3 and in a production step is particularly significant. The determination of the processing sequence in workstations 3 according to the proposal is explained below with reference to a single workstation 3:

The determination of the processing sequence in a workstation 3 for a certain production step is based primarily on the determination of the expected or actual occupation of working area 8 of workstation 3 by structural component(s) or structural component section(s) for the particular production step. The data required therefore can be obtained via a planning tool for material flow.

On the basis of the occupation of workstation 3, all of the operations O to be performed in said workstation 3 in said production step are then determined. In workstation 3c, for instance, the operations are those assigned to the structural component section of structural component 2c, which extends into workstation 3c, and to the structural component section of structural component 2d, which extends into workstation 3c. Finally, the processing sequence of operations O determined in this manner is optimized overall. The optimization criteria in this regard are discussed below.

The optimized processing sequence described above is then stored in order to be implemented mechanically.

Highly diverse variants of embodiments of processing machines 4 are feasible, of course. In this case and preferably, at least one processing machine 4 of at least one workstation 3 is a riveting machine, in particular a riveting robot. Accordingly, at least some of the mechanical operations O to be performed there are riveting operations.

In the preferred embodiment presented here, structural components 2 are airplane fuselage sections 2 which are conveyed along the longitudinal axis thereof through workstations 3. The longitudinal axes extend parallel to conveyance direction 7 mentioned above.

However, structural components 2 can also be airplane wing sections or the like, of course, which are also conveyed along the longitudinal axis thereof through workstations 3.

Figure 2:
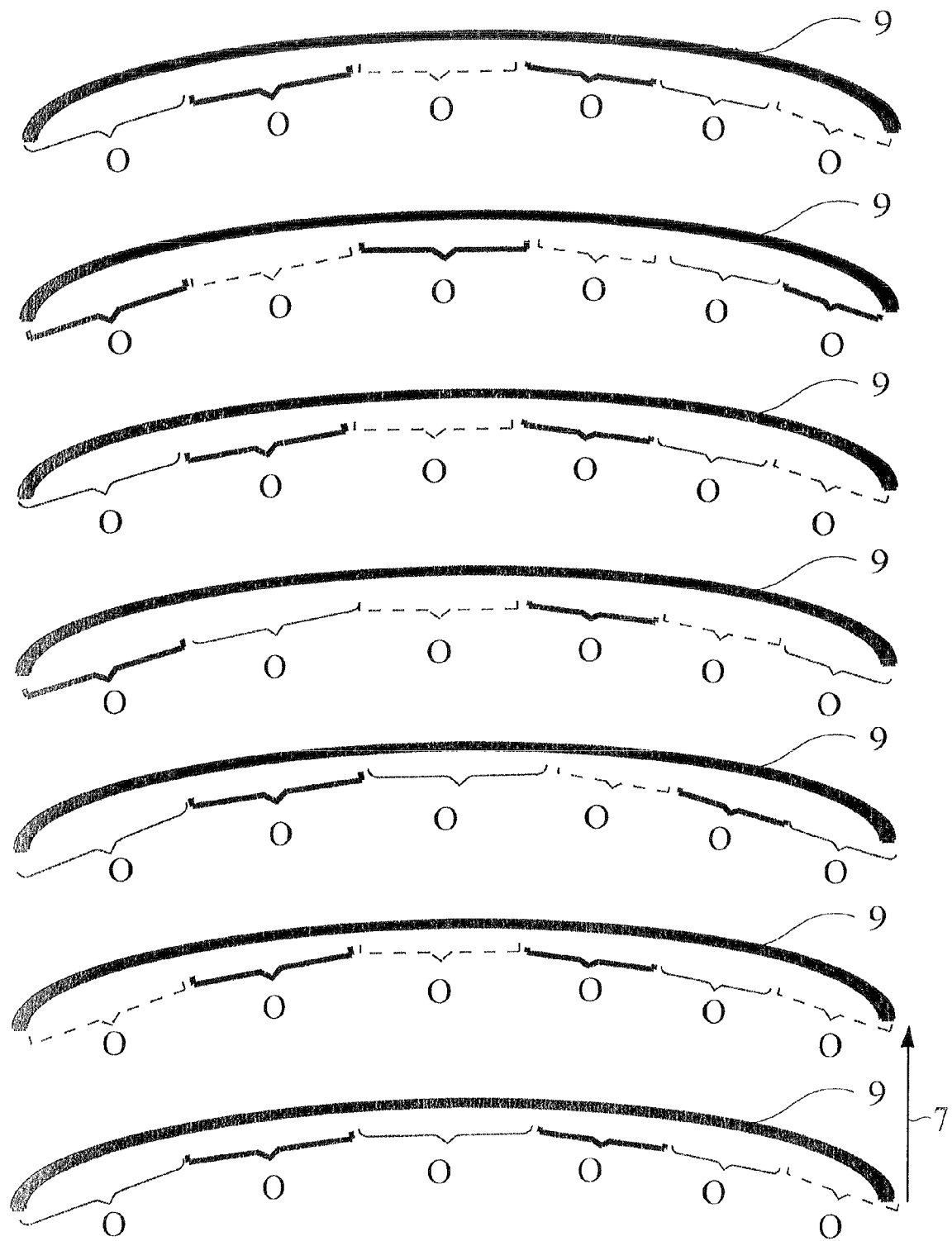
FIG. 2 shows, in an entirely schematic depiction, an occupation of the working area of a workstation, as an example, by a structural component section with assigned operations of different tool configurations.

FIG. 2 is a schematic depiction of the occupation by a structural component section of working area 8e of workstation 3e of production line 1 shown in FIG. 1. This structural component section, which is a portion of fuselage section 2f, is equipped with a row of parallel frames 9, which continues in conveyance direction 7.

Riveting operations O to be performed on frames 9 of related structural component section are also indicated in FIG. 2. In this case, one riveting operation O is represented by one bracket, the format of which indicates the operation type. The only important point to be made here is that there are different types of operations. The specific types of operations that are involved is irrelevant in terms of the proposed solution.

The processing sequence can be optimized as proposed before the applicable production step is reached. The advantage thereof is that optimization and the production operation are time-independent. This can be advantageous, for example, if the processing sequence needs to be examined in a simulation or the like.

When riveting robots are used in particular, processing machine 4 is a numerically controlled processing machine 4, and an NC program part is assigned to each operation O to be performed by said processing machine 4. Said NC program part can be generated offline and contain a sequence of movements and/or switching commands for an active tool that may be present. The NC program parts can be generated offline, using CAD programs or the like, for instance.

Using the NC program parts, and on the basis of the optimized processing sequence, an overall program flow is generated for the at least one NC processing machine 4. The overall program flow is then implemented within the applicable production step in the at least one processing machine 4.

Preferably, at least some of the processing machines 4 are now configured for the particular operation, wherein the optimization may also involve reducing configuration changes. In this case, the type of an operation depends on which configuration processing machine 4 must assume in order to perform the particular operation. The depiction shown in FIG. 2 illustrates the fact that a series of operations O is performed on each frame 9 of the structural component section; the different operation types are indicated by the particular bracket format.

Optimization in regard to reducing configuration changes can be implemented particularly easily by first grouping operations O having the same machine configuration. The grouping can be carried out, for example, by way of intermediate storage in sequence controller 6 or the like.

Figure 3:
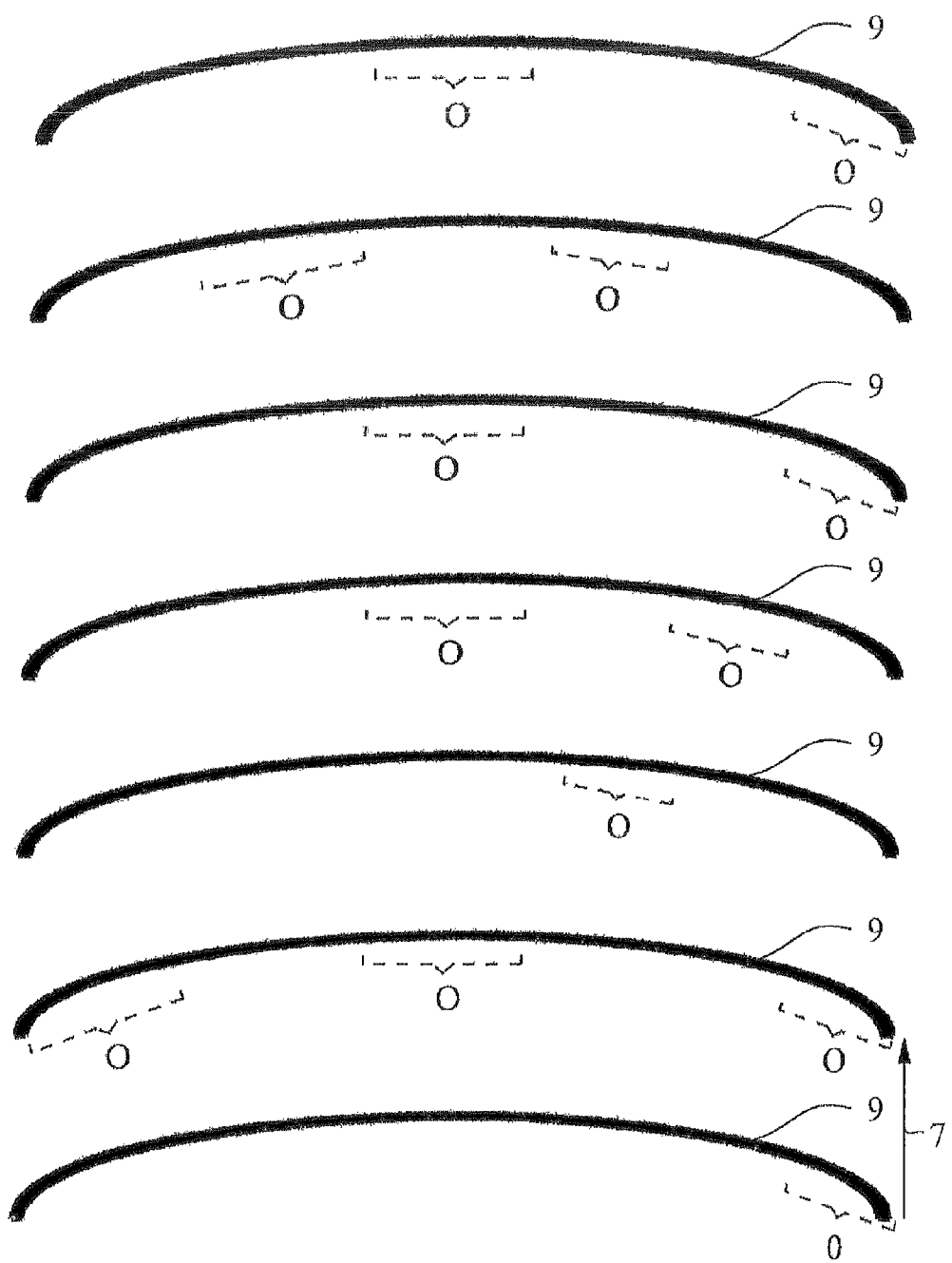
FIG. 3 shows the structural component section according to FIG. 2, with the operations of a first tool configuration.
Figure 4:
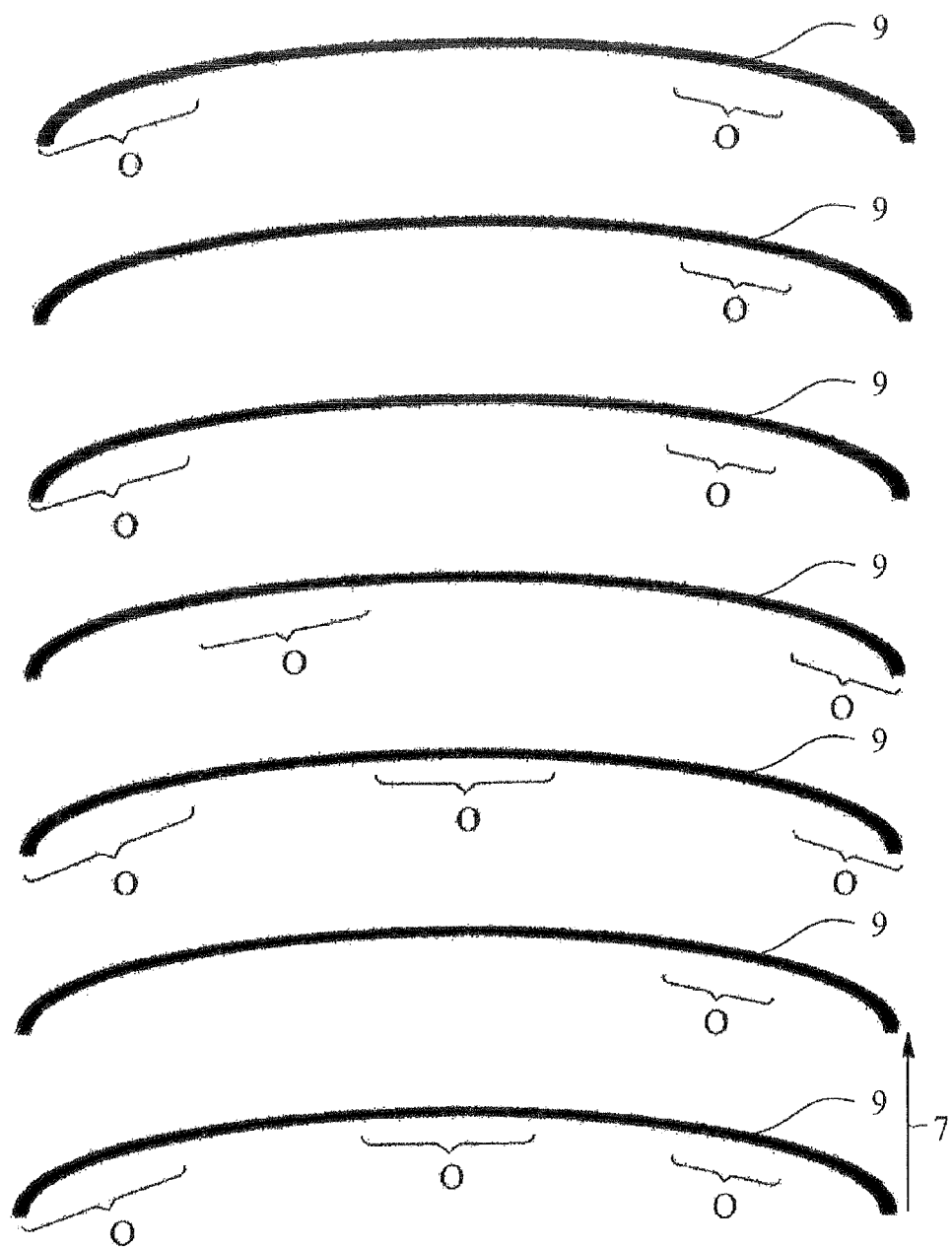
FIG. 4 shows the structural component section according to FIG. 2, with the operations of a second tool configuration.
Figure 5:
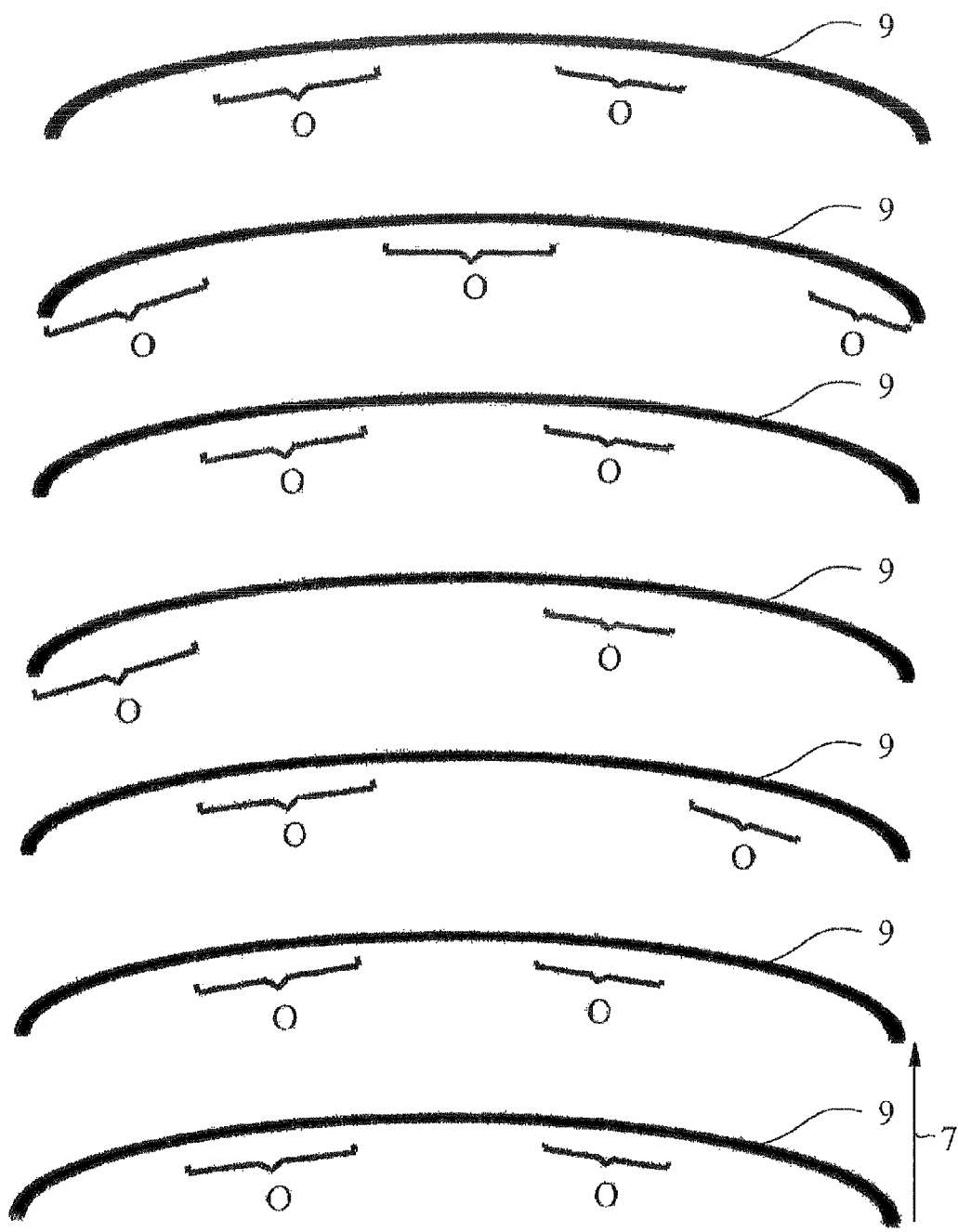
FIG. 5 shows the structural component section according to FIG. 2, with the operations of a third tool configuration.

The depictions presented in FIGS. 3, 4, and 5 illustrate the principle of the grouping of operations O by operation type. If operations O shown in FIG. 3 are performed first, followed by operations O shown in FIG. 4 and then operations O shown in FIG. 5, then only two configuration changes are required to perform all of the operations O shown in FIG. 2. It is thereby possible to save time and increase workpiece throughput on a regular basis, provided the production step is adapted accordingly.

The configuration described above can comprise different aspects depending on processing machine 4. For example, it may be necessary to perform a tool change for processing machines 4 depending on the operation O, wherein the optimization may also involve reducing tool changes.

It is also feasible, however, for the configuration to involve equipping processing machines 4 with consumable material or the like. This is relevant for riveting machines in particular, and riveting robots in particular, which may be equipped with different rivets depending on the operation O, wherein the optimization may also involve reducing the changes made to the particular equipping situation.

Another important optimization criterium is the processing time required to perform operations O in a workstation 3 during a production step.

For the case in which at least one of the processing machines 4 comprises a manipulator, in particular a robot, it is preferably provided that the optimization may also involve reducing displacement paths. By reducing multiple paths, it is also possible, of course, to reduce the processing time to a considerable extent.

The optimization criteria described above can be combined with one another or further optimization criteria depending on the fundamental condition. The depiction of individual optimization criteria is therefore intended to not be limiting.

According to a further teaching, which is significant in and of itself, above-described sequence controller 6 as such is claimed. Sequence controller 6 is coupled to machine controllers 5 of workstations 3 for control purposes. Sequence controller 6 determines the optimized processing sequence in the sense of the proposed method. Reference is made to all of the above-described embodiments in this regard.

In conjunction with sequence controller 6, the generation of the above-described overall program flow using the individual NC program parts and the optimized processing sequence is particularly significant. Sequence controller 6 generates the overall program flow described above, and initiates the implementation thereof in the at least one processing machine 4 within the applicable production step.

It will be understood that each of the elements described above, or two or more together, may also find a useful application in other types of methods and constructions differing from the types described above.

While the invention has been illustrated and described as embodied in a method for controlling a paced production line, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A method for controlling a paced production line with at least one workstation having at least one processing machine for processing airplane structural components, the method comprising the steps of:
performing a predetermined number of mechanical operations on each structural component section and conveying the structural components in succession through a working area of the workstation in a paced manner;
occupying the working area of the workstation by structural component sections of different structural components depending on a production step;
determining a processing sequence in the workstation for the production step by determining an occupation of the working area selected from the group consisting of an expected occupation and an actual occupation by structural component sections of different structural components for the production step;
on a basis of the occupation, determining all of forthcoming mechanical operations to be performed in the workstation in the production step;
optimizing the processing sequence of the forthcoming mechanical operations to obtain an optimized processing sequence; and
storing the optimized processing sequence in order to be implemented mechanically.

2. The method as defined in claim 1, further comprising providing the at least one processing machine of the at least one workstation as a riveting machine; and performing at least some of the mechanical operations as riveting operations.

3. The method as defined in claim 2, further comprising providing the riveting machine as a riveting robot.

4. The method as defined in claim 2, further comprising equipping the riveting machine with different rivets depending on the operation, and involving in an optimization a reduction of changes made to a particular equipping situation.

5. The method as defined in claim 1, further comprising using as the structural components, sections selected from the group consisting of airplane fuselage sections and airplane wing sections; and conveying the sections along a longitudinal axis thereof through the workstation.

6. The method as defined in claim 1, further comprising optimizing the processing sequence before an applicable production step is reached.

7. The method as defined in claim 6, further comprising configuring at least some of the processing machines for a particular one of the mechanical operations; and involving in the optimization a reduction of configuration changes.

8. The method as defined in claim 1, further comprising providing the at least one processing machine as a numerically controlled processing machine; assigning an NC program part to each of the operations to be performed by the processing machine; using the NC program part and on a basis of the optimized processing sequence, generating an overall program flow for the at least one processing machine; and implementing the overall program flow within an applicable production step on the at least one processing machine.

9. The method as defined in claim 1, further comprising, within a scope of the optimization, grouping all of the operations having a same machine configuration and processing all of the operations in groups.

10. The method as defined in claim 1, further comprising carrying out a tool change for the processing machine depending on a corresponding one of the mechanical operations, and involving in an optimization a reduction of tool changes.

11. The method as defined in claim 1, further comprising involving in an optimization a reduction of a processing time.

12. The method as defined in claim 1, further comprising providing in the at least one processing machine a manipulator, and involving in an optimization a reduction of displacement paths.

13. The method as defined in claim 12, further comprising providing the manipulator as a robot.

14. A sequence controller for a paced production line for processing airplane structural components, wherein the production line has at least one workstation with at least one processing machine, wherein the processing machine has a machine controller which is coupled to the sequence controller for control purposes, wherein a pre-determined number of mechanical operations is performed on each structural component section and the structural component sections are conveyed in successions through a working area of the workstation in a paced manner, wherein the working area of the workstation is occupied by structural component sections of different structural components depending on a production step,
and wherein said sequence controller is configured to determine a processing sequence in the workstation for a production step by determining an occupation selected from the group consisting of an expected occupation and an actual occupation by structural component sections of different structural components for the production step, and, on the basis of the occupation all of the mechanical operations to be performed in the workstation in the production step are determined and the processing sequence of the operations is optimized, and wherein the sequence controller stores the optimized processing sequence to be implemented mechanically.

15. A sequence controller as defined in claim 14, wherein the at least one processing machine is designed as a pneumatically controlled processing machine, an NC program part is assigned to each operation to be performed by the processing machine, and using the NC program parts and on a basis of the optimized processing sequence, the sequence controller generates an overall program flow for the at least one NC processing machine and initiates a processing within an applicable production step in the at least one processing machine.

* * * * *